United States Patent
Meng

(10) Patent No.: US 8,611,524 B2
(45) Date of Patent: Dec. 17, 2013

(54) METHOD, APPARATUS AND SYSTEM FOR CALL ROUTING

(75) Inventor: Yuetao Meng, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/542,584

(22) Filed: Jul. 5, 2012

(65) Prior Publication Data

US 2012/0275589 A1 Nov. 1, 2012

Related U.S. Application Data

(63) Continuation of application No. PCT/CN2010/080352, filed on Dec. 28, 2010.

(30) Foreign Application Priority Data

Jan. 5, 2010 (CN) .......................... 2010 1 0042618

(51) Int. Cl.
*H04M 3/00* (2006.01)

(52) U.S. Cl.
USPC ................................. 379/265.09; 379/265.01

(58) Field of Classification Search
USPC .............. 379/265.01–265.02, 265.09, 265.13
See application file for complete search history.

(56) References Cited

U.S. PATENT DOCUMENTS

| 5,563,941 | A | 10/1996 | Stademann |
| 6,704,409 | B1 | 3/2004 | Dilip et al. |
| 7,460,652 | B2 * | 12/2008 | Chang ........................ 379/88.18 |
| 2002/0087393 | A1 | 7/2002 | Philonenko |
| 2002/0101978 | A1 | 8/2002 | Lo |
| 2003/0026414 | A1 * | 2/2003 | Baker et al. .............. 379/265.13 |
| 2005/0047579 | A1 * | 3/2005 | Salame .................... 379/265.09 |

FOREIGN PATENT DOCUMENTS

| CN | 1223529 A | 7/1999 |
| CN | 1700716 A | 11/2005 |
| WO | WO 02/076069 A1 | 9/2002 |

OTHER PUBLICATIONS

Extended European Search Report regarding European Patent Application No. 10841981, dated Sep. 20, 2012, 6 pages.
Translation of International Search Report regarding International Patent Application No. PCT/CN2010/080352, dated Apr. 7, 2011, 3 pages.
Translation of Written Opinion of the International Searching Authority regarding International Patent Application No. PCT/CN2010/080352, dated Apr. 7, 2011, 4 pages.
First Office Action of Chinese Application No. 201010042618.6 mailed Feb. 4, 2013, 19 pages. (Partial Translation).
Second Office Action of Chinese Application No. 201010042618.6 mailed May 29, 2013, 17 pages.

* cited by examiner

*Primary Examiner* — Rasha Al Aubaidi
(74) *Attorney, Agent, or Firm* — Slater & Matsil, L.L.P.

(57) ABSTRACT

Embodiments of the present invention disclose a method for call routing, including receiving routing request information sent by computer telephony integration. The routing request information carries customer media information. Customer requirement quality of service is calculated according to the customer media information, and an agent is selected corresponding to the customer requirement quality of service according to the customer requirement quality of service to make a service capability of the agent match a network quality requirement, thereby improving the quality of service.

14 Claims, 2 Drawing Sheets

METHOD, APPARATUS AND SYSTEM FOR CALL ROUTING

CROSS-REFERENCE TO RELATED APPLICATIONS

This application is a continuation of International Application No. PCT/CN2010/080352, filed on Dec. 28, 2010, which claims priority to Chinese Patent Application No. 201010042618.6, filed on Jan. 5, 2010, both of which are hereby incorporated by reference in their entireties.

FIELD OF THE INVENTION

The present invention relates to the field of communications, and in particular, to a method, an apparatus and a system for call routing.

BACKGROUND OF THE INVENTION

Originated from the demand for quality of service in developed countries, a contact center aims at providing customers with services such as prompt and accurate consulting information, and service handling and complaint through telephony and faxing, and improving the satisfaction level of customers as much as possible through highly efficient means such as automatic call distribution (ACD, Automatic Call Distribution), computer telephony integration (CTI, Computer Telephony Integration), and an automatic response system (IVR, Interaction Voice Response) of a stored program control switch and experienced manual agents. With the development and convergence of communications and computer technologies in recent years, the introduction of the distribution technology makes it unnecessary for manual agent representatives to work at one place. With the appearance of the automatic voice response devices, the work of the manual agent representatives is largely replaced, and in addition, a call center is capable of running uninterruptedly for 24 hours. The revolution of the Internet and the communication manners further enables the call center to process the fax, e-mail, Web access, and even teleconference and video conference based on the Internet in addition to the telephony. For different customers, hierarchical services provide different levels of services. For example, calls of VIP customers are directly forwarded to a high skill agent for services, and calls of ordinary users are first served by the automatic IVR. Quality of service (QoS, Quality of Service) refers to a capability of an IP network, namely, serving a specific service as required on an IP network across multiple underlying network technologies (MP, FR, ATM, Ethernet, SDH, MPLS, and the like). The connotation of IP QoS includes bandwidth/throughput, delay, jitter, packet loss ratio, and availability. With the development of the network technology and the change of the working manner, the agent may remotely access a CTI system through a network; for example, as a SOHO agent, the agent accesses a call center system from home. However, as video and audio are highly sensitive to the transmission delay and packet loss ratio of the network QoS, a remote agent is unlikely to access the network QoS due to the access network. If the QoS problem is not considered during call distribution, a certain customer call may be allocated to a remote agent with the unmatched QoS. For example, the customer accesses the call center by using a video telephone; however, the CTI allocates the call to an agent terminal that accesses a network through the ADSL. Owing to factors such as bandwidth and packet loss, the customer may fail to normally communicate with the agent. The satisfaction level of the customer is severely affected.

SUMMARY OF THE INVENTION

Accordingly, the present invention provides a method, an apparatus and a system for call routing, thereby solving a problem that a customer requirement is not matched with an agent capability.

A method for call routing is provided, where the method includes: receiving routing request information sent by an information processing device, where the routing request information carries customer media information; acquiring customer requirement quality of service according to the customer media information; and determining an agent or an automatic response system IVR according to the customer requirement quality of service, where the agent or the automatic response system IVR is matched with the customer requirement quality of service.

A routing server is provided, where the routing server includes: a receiving module, configured to receive routing request information sent by an information processing device, where the routing request information carries customer media information; a calculation module, configured to acquire customer requirement quality of service according to the customer media information; and a matching module, configured to determine an agent or an automatic response system IVR according to the customer requirement quality of service, where the agent or the automatic response system IVR is matched with the customer requirement quality of service.

A system for call routing is provided, where the system includes: a routing server, configured to receive routing request information sent by an information processing device, where the routing request information carries customer media information, acquire customer requirement quality of service according to the customer media information, and determine an agent or an automatic response system IVR is matched with the customer requirement quality of service; and the information processing device, configured to send the routing request information to the routing server, where the routing request information carries the customer media information.

According to the embodiments of the present invention, routing request information sent by computer telephony integration is received, where the routing request information carries customer media information; customer requirement quality of service is calculated according to the customer media information; and an agent corresponding to the customer requirement quality of service is selected according to the customer requirement quality of service, so that a service capability of the agent can match a network quality requirement, and the quality of service is improved.

DETAILED DESCRIPTION OF THE EMBODIMENTS

To make persons skilled in the art better understand the content of the present invention, the content of the present invention is described in detail below with reference to the accompanying drawings and specific embodiments.

Figure 1:
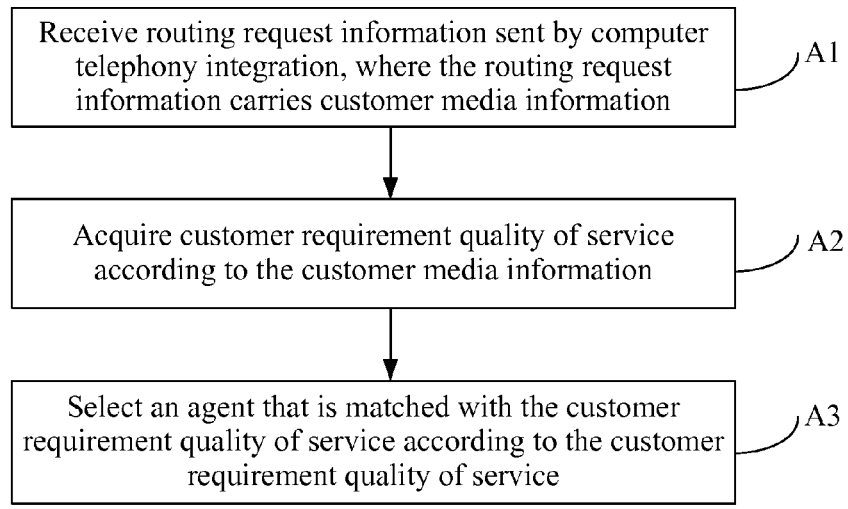
FIG. 1 is a flow chart of a method for call routing provided in an embodiment of the present invention.

Reference can be made to FIG. 1 for a basic process of a method for call routing according to an embodiment of the present invention, and the method mainly includes the following steps.

A1: Receive routing request information sent by computer telephony integration (CTI), where the routing request information carries customer media information.

A terminal (which, for example, may be a mobile phone, a fixed terminal, or another type of terminal) initiates a call to a universal access device (UAP, Universal Access Platform). After the UAP receives a call message from the terminal, the UAP initiates a call request to the CTI, and carries the customer media information, where the customer media information at least includes: audio/video information and service information such as a calling/called number and a calling/called status of a user. The CTI initiates the routing request information to a routing server and carries the customer media information.

In the specific implementation, the terminal (or anther SIP client) initiates call signaling INVITE to the UAP, and carries the customer media information in a session description protocol (SDP, Session Description Protocol). The UAP initiates the call request to the CTI after receiving the call message from the client, which may be specifically implemented as follows:

```
INVITE sip:[service]@[remote_ip]:[remote_port] SIP/2.0
    Via: SIP/2.0/[transport] [local_ip]:[local_port];branch=[branch]
    From: sipp <sip:sipp@[local_ip]:[local_port]>;tag=[call_number]
    To: sut <sip:[service]@[remote_ip]:[remote_port]>
    Call-ID: [call_id]
    CSeq: 1 INVITE
    Contact: sip:sipp@[local_ip]:[local_port]
    Max-Forwards: 70
    Subject: Performance Test
    Content-Type: application/sdp
    Content-Length: [len]
    v=0
    o=user1 53655765 2353687637 IN IP[local_ip_type] [local_ip]
    s=-
    c=IN IP[media_ip_type] [media_ip]
    t=0 0
    m=audio [media_port] RTP/AVP 0
    a=rtpmap:0 PCMU/8000
where m=audio [media_port] RTP/AVP 0, a=rtpmap:0 PCMU/8000,
indicating that a code for encoding/decoding is G.711 30 ms.
```

In another specific example, such as in an outgoing-call scenario, telemarketing for example, the CTI initiates a call to a user to promote a certain type of product, and the CTI initiates the call to the client through the UAP, and then acquires the customer media information through a response of the client. A specific implementation may be as follows:

```
INVITE sip:[service]@[remote_ip]:[remote_port] SIP/2.0
SIP/2.0 200OK
    Via: SIP/2.0/[transport] [local_ip]:[local_port];branch=[branch]
    From: sipp <sip:sipp@[local_ip]:[local_port]>;tag=[call_number]
    To: sut <sip:[service]@[remote_ip]:[remote_port]>
    Call-ID: [call_id]
    CSeq: 1 INVITE
    Content-Type: application/sdp
    Content-Length: [len]
    v=0
    o=user1 53655765 2353687637 IN IP[local_ip_type] [local_ip]
    s=-
    c=IN IP[media_ip_type] [media_ip]
    t=0 0
    m=audio [media_port] RTP/AVP 0
    a=rtpmap:0 PCMU/8000
where m=audio [media_port] RTP/AVP 0, a=rtpmap:0 PCMU/8000,
indicating that a code for encoding/decoding is G.711 30 ms.
```

The client responds, and the UAP receives, from the client, a call response message request which carries the media information.

A2: Acquire customer requirement quality of service according to the customer media information.

The routing server acquires the customer requirement quality of service (QoS, quality of service) according to the customer media information. During the specific implementation, the customer requirement QoS may be acquired through conversion according to Table 1, a quality of service data table, in a database. For example, if the audio/video information in the customer media information carries encoding/decoding information, corresponding customer requirement QoS is acquired according to the coding/decoding information. For example, when the code for encoding/decoding is G.711 30 ms, the corresponding customer requirement QoS is specifically as follows: the payload is 240, the packet length is 240+78, and the rate is 84.8 K.

TABLE 1

| Code encoding/decoding | forPayload (byte) | Ethernet packet length (byte) | Ethernet rate (bps) |
|---|---|---|---|
| AMR 12.2k 20 ms | 35 | 35 + 78 | 45.2k |
| G.711 30 ms | 240 | 240 + 78 | 84.8k |
| G.711 20 ms | 160 | 160 + 78 | 95.2k |
| G.711 10 ms | 80 | 80 + 78 | 126.4k |
| G.711 5 ms | 40 | 40 + 78 | 188.8k |
| G.729 20 ms | 20 | 20 + 78 | 39.2k |
| G.729 10 ms | 10 | 10 + 78 | 70.4k |
| G.723 30 ms | 20/24 | 20/24 + 78 | 26.1k/27.2k |

A3: Select an agent or an automatic response system IVR according to the customer requirement quality of service, where the agent or the automatic response system IVR is matched with the customer requirement quality of service.

For example, in this step, the customer requirement QoS may be matched with agent quality of service QoS by querying quality of service data matching information, Table 2, in the database, and a matched agent is selected according to a certain policy in combination with indexes such as skill and put-through ratio. For example, network quality properties of an agent A or IVR A are specifically: a bandwidth A, a delay B, a packet loss C, and jitter D, and a matching process is mainly: selecting an agent with a bandwidth that matches a rate of the customer requirement QoS. When multiple agents that meet a condition that the bandwidth matches the rate exist at the same time, the skill level and put-through ratio are considered at the same time, and preferentially, an agent or an automatic response system IVR with a high skill level and a high put-through ratio is selected.

Alternatively, the customer requirement QoS may also be changed according to a specific policy, that is, an agent is reselected after the UAP renegotiates with the terminal. A specific implementation example is that: if a customer originally requests a video and no video agent that is idle exists in a certain period of time, or the customer is an ordinary user and a video agent service is not provided, the UAP renegotiates with the client, and the renegotiation specifically may be sending a change request to the customer, and then providing an audio service for the customer if the customer agrees. Specifically, the UAP may send a SIP Reinvite message for implementation.

TABLE 2

| Agent | Quality of service |
| --- | --- |
| Agent A or IVR A | Bandwidth, delay, packet loss, jitter |
| Agent B or IVR B | Bandwidth, delay, packet loss, jitter |
| Agent C or IVR C | Bandwidth, delay, packet loss, jitter |

Three situations of QoS of an agent A or IVR A, an agent B or IVR B, an agent C or IVR C are described respectively through specific examples below, referring to FIG. 2.

1. A media stream of the client passes through an NGN/PSTN network and arrives at the UAP, and then arrives at an agent terminal A or IVR A through a LAN. In the entire path, QoS of the NGN is superior to the LAN; QoS that can be provided by the agent A or IVR A is QoS between the agent A or IVR A and the UAP; the customer requirement QoS is QoS of the media stream of the client after the media stream of the client passes through the UAP.

2. A media stream of the client passes through an NGN/PSTN network and arrives at the agent B or IVR B. The customer requirement QoS is a bandwidth that the NGN/PSTN allocates for the client, and QoS of the agent B or IVR B is a bandwidth that the NGN/PSTN allocates for the agent B.

3. A media stream of the client passes through an NGN/PSTN network and arrives at an agent terminal C or IVR C through an access network. QoS is provided by an access device in the access network. The customer requirement QoS is QoS that the access device allocates for the client. The agent QoS is a bandwidth that the access device allocates for the agent C or IVR C.

The above three situations are specific processes that the routing server collects the agent QoS, and saves the collected agent QoS to quality of service data matching information in the database, where the data may be statically configured, or may be acquired by a QoS collection module periodically. In the specific implementation, the routing server may collect the agent QoS in the following manners: the agent periodically initiates a call test to a CTI platform, and the CTI reports to the routing server; alternatively, the data is statically configured and imported, for example, the agent QoS is imported to the routing server according to a protocol signed with the operator; alternatively, the CTI acquires the agent QoS according to a capability or trunk prefix of the agent, and the CTI reports to the routing server according to the trunk prefix of the agent.

According to the embodiment of the present invention, routing request information sent by computer telephony integration is received, where the routing request information carries customer media information, customer requirement quality of service is calculated according to the customer media information, and an agent corresponding to the customer requirement quality of service is selected according to the customer requirement quality of service, so that a service capability of the agent can match a network quality requirement, and the quality of service is improved.

Figure 3:
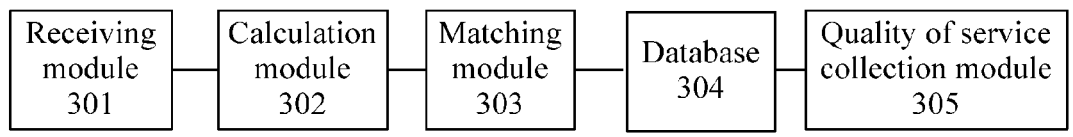
FIG. 3 is a basic block diagram of a service router provided in an embodiment of the present invention.

Refer to FIG. 3 for a structural diagram of a routing server according to an embodiment of the present invention, which mainly includes the following.

A receiving module 301 is configured to receive routing request information sent by an information processing device, where the routing request information carries customer media information, and the customer media information at least includes: audio/video information and service information (such as a calling/called number and an calling/called status) of a user. The information processing device herein may be a CTI, and a specific example may be that the CTI sends, to the routing server, the routing request information carrying the customer media information after the CTI receives a call request initiated by a UAP (for example, the UAP initiates the call request to the CTI after receiving a call message from a client, where the request carries the customer media information).

A calculation module 302 is configured to calculate customer requirement quality of service according to the customer media information.

During the specific implementation, a bandwidth may be calculated for the customer requirement QoS according to the customer media information received by the receiving module 301. The calculation module 302 may perform conversion through Table 1, a quality of service data table. For example, an encoding/decoding parameter may be carried in the customer media information, and corresponding customer requirement QoS may be acquired according to the encoding/decoding parameter. A specific conversion process is the same as the implementation manner of the aforementioned corresponding method embodiment, and is not described in detail herein again.

A matching module 303 is configured to determine an agent according to the customer requirement QoS, where the agent is matched with the customer requirement quality of service. A specific example may be: matching the customer requirement QoS and agent quality of service QoS through quality of service data matching information, for example, by querying table 2, and selecting a matched agent according to a certain policy in combination with indexes such as a skill and a put-through ratio. A specific implementation example may be that network quality properties of an agent A or IVR A specifically are a bandwidth A, a delay B, a packet loss C, and jitter D. A matching process is mainly: selecting an agent with a width that matches a rate of QoS. When multiple agents that meet a condition that the bandwidth matches the rate exist at the same time, the skill level and put-through ratio are considered at the same time, and preferentially, an agent or an automatic response system IVR with a high skill level and put-through ratio is selected.

In another example, the matching module may also change the customer requirement QoS according to a specific policy. For example, when finding that an agent meeting a requirement does not exist, the routing server notifies the UAP, and the UAP reselects an agent after renegotiating with the terminal. If the customer originally requests a video and no video agent that is idle exists in a certain period of time, or the customer is an ordinary user and a video agent service is not provided, the UAP renegotiates with the client, and the renegotiation specifically may be sending a change request to the customer, and then providing an audio service for the customer if the customer agrees. Specifically, the UAP may send a SIP Reinvite message for implementation.

In another specific embodiment, the routing server may further include:

a database 304, configured to store a quality of service data table and quality of service data matching information, where the calculation module 302 interacts with the database to acquire the quality of service data table, and the matching module 303 interacts with the database to acquire the quality of service data matching information; and a quality of service collection module 305, configured to collect agent quality of service data, and save the agent quality of service data to the quality of service data matching information in the database 304, where the data may be configured statically, or may be acquired by the QoS collection module periodically.

Figure 2:
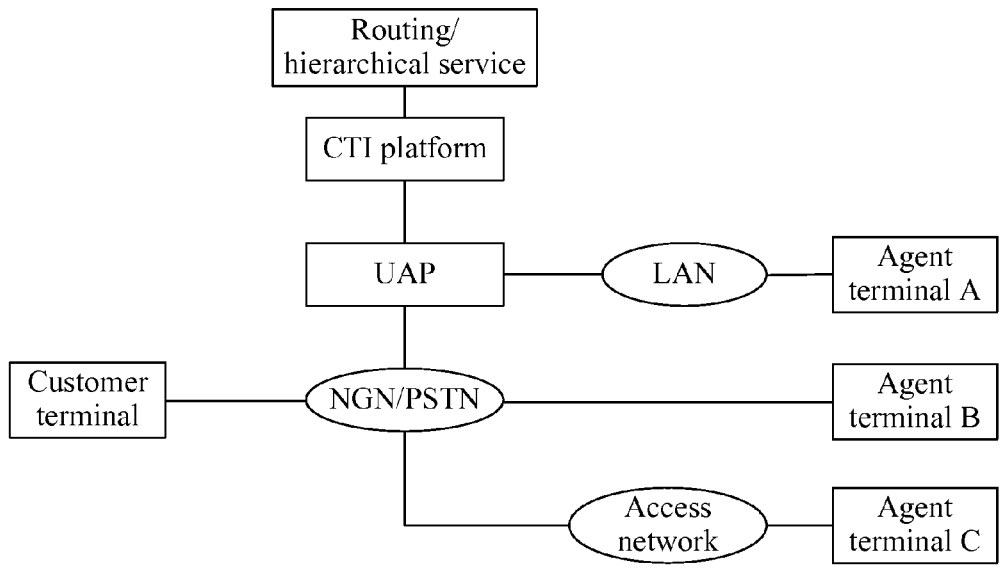
FIG. 2 is a diagram of a situation where quality of service data matches with information provided in an embodiment of the present invention.

How the quality of service collection module 305 acquires quality of service of an agent A, agent B and agent C is described respectively through specific examples, referring to FIG. 2.

In the specific examples, FIG. 2 may be defined by three situations, namely QoS of the agent A or IVR A, agent B or IVR B, and agent C or IVR C.

1. A media stream of the client passes through an NGN/PSTN network and arrives at the UAP, and then arrives at an agent terminal A or IVR A through a LAN. In the entire path, QoS of the NGN is superior to the LAN; QoS that can be provided by the agent A or IVR A is QoS between the agent A or IVR A and the UAP; the customer requirement QoS is QoS of the media stream of the client after the media stream of the client passes through the UAP.

2. A media stream of the client passes through an NGN/PSTN network and arrives at the agent B or IVR B. The customer requirement QoS is a bandwidth that the NGN/PSTN allocates for the client, and QoS of the agent B or IVR B is a bandwidth that the NGN/PSTN allocates for the agent B.

3. A media stream of the client passes through an NGN/PSTN network and arrives at an agent terminal C or IVR C through an access network. QoS is provided by an access device in the access network. The customer requirement QoS is QoS that the access device allocates for the client; the agent QoS is a bandwidth that the access device allocates for the agent C or IVR C.

In the specific implementation, the quality of service collection module 305 may collect the agent QoS in the following manners: the agent periodically initiates a call test to a CTI platform, and the CTI reports to the quality of service collection module 305 of the routing server; alternatively, through static configuration import, for example, the agent QoS is imported to the quality of service collection module 305 of the routing server according to protocols signed with the operator; alternatively, the CTI acquires the agent QoS according to a capability or trunk prefix of the agent, and the CTI reports to the quality of service collection module 305 of the routing server according to the trunk prefix of the agent.

According to the embodiment of the present invention, routing request information sent by computer telephony integration is received, where the routing request information carries customer media information, customer requirement quality of service is calculated according to the customer media information, and an agent corresponding to the customer requirement quality of service is selected according to the customer requirement quality of service, so that a dynamically collected service capability of the agent can match a network quality requirement, and the quality of service can be improved. When the agent that is matched with the customer requirement quality of service does not exist, rematching is performed through by changing the customer requirement quality of service, thereby improving the flexibility of matching.

Figure 4:
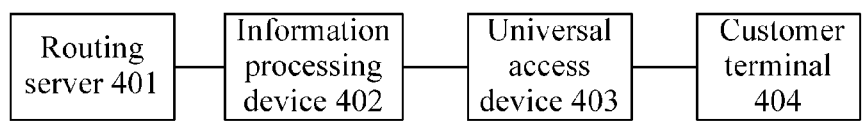
FIG. 4 is a basic block diagram of a system for call routing provided in an embodiment of the present invention.

Refer to FIG. 4 for a basic block diagram of a system for call routing according to an embodiment of the present invention, which mainly includes the following.

A routing server 401 is configured to receive routing request information sent by an information processing device (such as a CTI), where the routing request information carries customer media information, and the customer media information at least includes: audio/video information and service information such as a calling/called number and an calling/called status of a user; acquire customer requirement quality of service according to the customer media information, and determine, according to the customer requirement quality of service, an agent that is matched with the customer requirement quality of service, where the customer requirement QoS may be acquired through conversion according to a quality of service data table, such as Table 1, in a database. For example, if the media information includes encoding/decoding information, corresponding customer requirement QoS is acquired according to the encoding/decoding information. For example, when a code for encoding/decoding is G.711 30 ms, the corresponding customer requirement QoS is specifically as follows: a payload is 240, a packet length is 240+87, and a rate is 84.8 K. Further, the routing server matches the customer requirement QoS and agent quality of service QoS by querying quality of service data matching information, such as Table 2, in the database, and selects a matched agent according to a certain policy in combination with indexes such as a skill and put-through ratio. For example, network quality properties of an agent A or IVR A are specifically: a bandwidth A, a delay B, a packet loss C, and jitter D, and a matching process is mainly: selecting an agent with a bandwidth matching a rate of QoS. When multiple agents that meet a condition that the bandwidth matches the rate exist at the same time, the skill level and put-through ratio are considered at the same time, and preferentially, an agent or an automatic response system IVR with a high skill level and a high put-through ratio is selected.

The routing server 401 is further configured to notify the UAP when the routing server finds that an agent meeting requirements does not exist, and the UAP reselects an agent after renegotiating with a terminal. If the customer originally requests a video and no video agent that is idle exists in a certain period of time, or the customer is an ordinary user and a video agent service is not provided, the UAP renegotiates with the client, and the renegotiation specifically may be sending a change request to the customer, and then providing an audio service for the customer if the customer agrees. Specifically, the UAP may send a SIP Reinvite message for implementation.

The system may further include: an information processing device 402, configured to send routing request information to a routing server 401, where the routing request information carries customer media information; and the information processing device 402 may specifically be a CTI.

The system may further include a universal access device 403, configured to receive a call from a customer terminal, initiate a call request to the information processing device, and carry the customer media information.

The system may further include a customer terminal 404, configured to initiate a call to the universal access device.

According to the embodiment of the present invention, routing request information sent by computer telephony integration is received, where the routing request information carries customer media information, customer requirement quality of service is calculated according to the customer media information, and an agent corresponding to the customer requirement quality of service is selected according to the customer requirement quality of service, so that a service capability of the agent can match a network quality requirement, and the quality of service can be improved.

Figure 5:
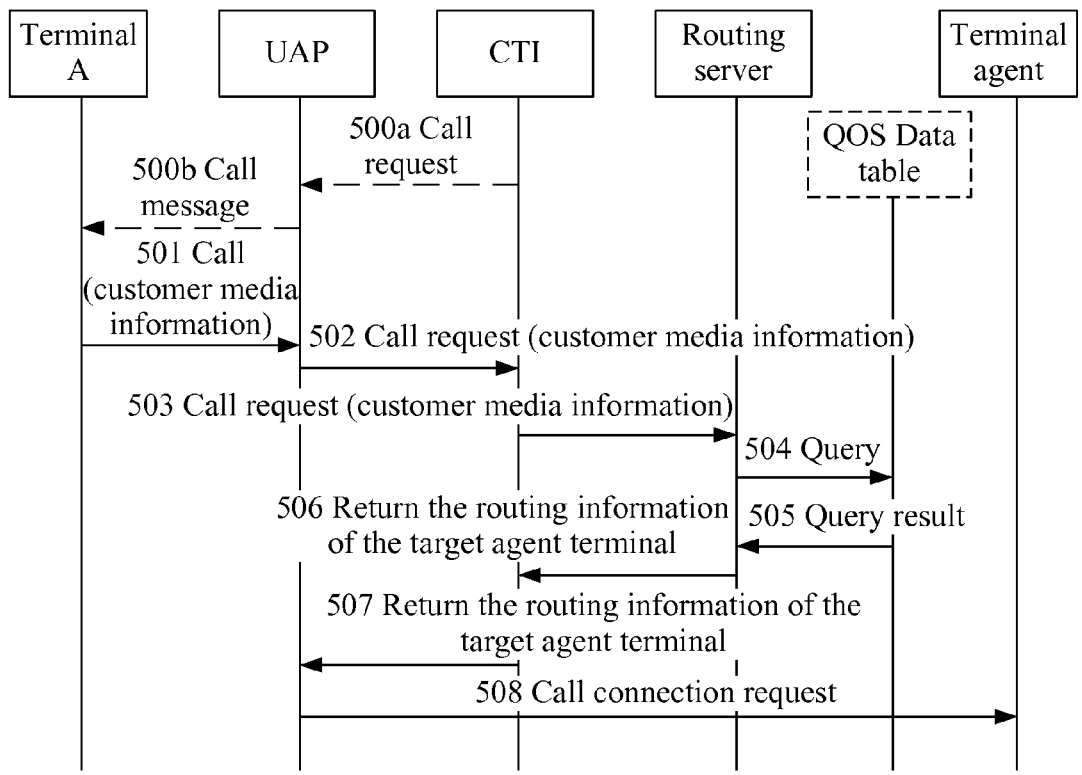
FIG. 5 is a specific implementation diagram of a method for call routing provided in an embodiment of the present invention.

For better understanding of the above embodiment, a specific execution process of a method for call routing is taken as an example for description, and a schematic flow chart is shown in FIG. 5, which includes a terminal A, a universal access device UAP, computer telephony integration CTI, a routing server, and an agent terminal, where the routing server includes a database that stores a quality of service data table, and a quality of service acquisition module, and a specific process is described as follows.

501: The terminal A initiates a call to the UAP, where call information includes customer media information, and the customer media information at least includes audio/video information and service information of a user.

In another specific example, such as in an out-going call scenario, telemarketing for example, in step 500*a*, the CTI sends an out-going call request to the UAP, and in step 500*b*, the UAP sends a call message to the customer terminal. The customer terminal carries the customer media information in a call response and the CTI initiates request routing information to the routing server and carries the customer media information.

The specific implementation is as follows:

---

INVITE sip:[service]@[remote_ip]:[remote_port] SIP/2.0
SIP/2.0 200OK
    Via: SIP/2.0/[transport] [local_ip]:[local_port];branch=[branch]
    From: sipp <sip:sipp@[local_ip]:[local_port]>;tag=[call_number]
    To: sut <sip:[service]@[remote_ip]:[remote_port]>
    Call-ID: [call_id]
    CSeq: 1 INVITE
    Content-Type: application/sdp
    Content-Length: [len]
    v=0
    o=user1 53655765 2353687637 IN IP[local_ip_type] [local_ip]
    s=-
    c=IN IP[media_ip_type] [media_ip]
    t=0 0
    m=audio [media_port] RTP/AVP 0
    a=rtpmap:0 PCMU/8000
where m=audio [media_port] RTP/AVP 0, a=rtpmap:0 PCMU/8000, indicating G.711 30 ms.

---

The customer terminal responds, and the UAP receives a call response message request from the customer, where the call response message request carries the media information.

502: The UAP sends a call request to the CTI.

After receiving the call from the terminal A, the UAP sends the call request to the CTI, where the request includes the customer media information, and the specific implementation is as follows:

---

INVITE sip:[service]@[remote_ip]:[remote_port] SIP/2.0
    Via: SIP/2.0/[transport] [local_ip]:[local_port];branch=[branch]
    From: sipp <sip:sipp@[local_ip]:[local_port]>;tag=[call_number]
    To: sut <sip:[service]@[remote_ip]:[remote_port]>
    Call-ID: [call_id]
    CSeq: 1 INVITE
    Contact: sip:sipp@[local_ip]:[local_port]
    Max-Forwards: 70
    Subject: Performance Test
    Content-Type: application/sdp
    Content-Length: [len]
    v=0
    o=user1 53655765 2353687637 IN IP[local_ip_type] [local_ip]
    s=-
    c=IN IP[media_ip_type] [media_ip]
    t=0 0
    m=audio [media_port] RTP/AVP 0
    a=rtpmap:0 PCMU/8000
where m=audio [media_port] RTP/AVP 0, a=rtpmap:0 PCMU/8000, indicating G.711 30 ms.

---

503: The CTI sends a call request to the routing server.

After receiving the call from the UAP, the CTI sends a call request to the routing server, where the request includes customer media information.

504: The routing server queries an agent matching customer requirement quality of service from the QoS data table.

After receiving the call request, the routing server calculates the customer requirement quality of service QoS according to the customer media information.

During the specific implementation, the customer requirement QoS may be calculated according to Table 1, a quality of service data table, in the database. For example, when a code for encoding/decoding is G.711 30 ms, corresponding customer requirement QoS specifically is as follows: a payload is 240, a packet length is 240+87, and a rate is 84.8K. Then, the routing server selects, according to the calculated customer requirement quality of service, the agent that is matched with the customer requirement quality of service.

The customer requirement QoS and the agent quality of service QoS are matched by querying quality of service data matching information, Table 2, in the database, and a matched agent is selected according to a certain policy in combination with indexes such as a skill and put-through ratio. For example, network quality properties of the agent A or IVR A are specifically: a bandwidth A, a delay B, a packet loss C and jitter D, and a matching process is mainly: selecting an agent with a bandwidth matching a rate of QoS. When multiple agents that meet a condition that the bandwidth matches the rate exist at the same time, the skill level and put-through ratio are considered at the same time, and preferentially, an agent or automatic response system IVR with a high skill level and a high put-through ratio is selected.

Optionally, the customer requirement QoS may also be changed according to a specific policy, that is, the UAP reselects an agent after renegotiating with the terminal. If the customer originally requests a video and no video agent that is idle exists in a certain period of time, or the customer is an ordinary user and a video agent service is not provided, the UAP renegotiates with the client, and the renegotiation specifically may be sending a change request to the customer, and then providing an audio service for the customer if the customer agrees. Specifically, the UAP may send a SIP Reinvite message for implementation.

505: The QoS data table returns a query result to the routing server.

Herein, the query request is routing information of a target agent.

506: The routing server returns the routing information of a target agent terminal to the CTI.

507: The CTI returns the routing information of the target agent terminal to the UAP.

508: The UAP sends a link setup request to the target terminal.

After receiving the routing information of the target agent terminal, the UAP sends the link setup request to the target agent terminal, to implement communications between the terminal A and the target agent terminal.

According to the embodiment of the present invention, routing request information sent by computer telephony integration is received, where the routing request information carries customer media information, customer requirement quality of service is calculated according to the customer media information, and an agent corresponding to the customer requirement quality of service is selected according to the customer requirement quality of service, so that a service capability of the agent can match a network quality requirement, and the quality of service can be improved.

Persons of ordinary skill in the art should understand that all or a part of the steps of the methods according to the embodiments may be implemented by a program instructing relevant hardware. The program may be stored in a computer readable storage medium, and the storage medium may include a ROM, a RAM, a magnetic disk or an optical disk.

A method, a system and an apparatus for restricting calls of a calling user provided in the embodiments of the present invention are described. Specific embodiments are used for illustrating principles and implementation manners of the present invention. The above description of the embodiments is merely for understanding the method and core ideas of the present invention. Meanwhile, persons of ordinary skill in the art may make modifications to the specific implementation manners and application scope according to the idea of the present invention. In conclusion, the content of the specification shall not be construed as a limitation to the present invention.

What is claimed is:

1. A method for call routing, comprising:
   receiving routing request information sent by an information processing device, wherein the routing request information carries customer media information, the customer information comprising an encoding format used for encoding media stream;
   acquiring customer requirement quality of service according to the encoding format carried in the customer media information, wherein the customer requirement quality of service comprises a rate for transmitting media stream that is encoded by using the encoding format; and
   selecting an agent or an automatic response system IVR that is matched with the customer requirement quality of service according to the customer requirement quality of service, wherein selecting the agent or the automatic response system IVR that is matched with the customer requirement quality of service according to the customer requirement quality of service comprises:
      querying quality of service data matching information which comprises a relationship between the agent or the automatic response system IVR and a bandwidth allocated for the agent or the automatic response system IVR;
      determining the bandwidth that matches the rate for transmitting media stream; and
      selecting the agent or the automatic response system IVR corresponding to the determined bandwidth that matches the rate for transmitting media stream according to the quality of service data matching information.

2. The method according to claim 1, further comprising, if an agent that is matched with the customer requirement quality of service exists in the quality of service data matching information, sending routing information of the agent or the automatic response system IVR to the information processing device.

3. The method according to claim 2, further comprising, if an agent that is matched with the customer requirement quality of service does not exist in the quality of service data matching information, re-determining the customer requirement quality of service after renegotiation with a terminal, and determining an agent or an automatic response system IVR that is matched with the redetermined customer requirement quality of service according to the re-determined customer requirement quality of service.

4. The method according to claim 1, further comprising, if an agent that is matched with the customer requirement quality of service does not exist in the quality of service data matching information, re-determining the customer requirement quality of service after renegotiation with a terminal, and determining an agent or an automatic response system IVR that is matched with the redetermined customer requirement quality of service according to the re-determined customer requirement quality of service.

5. The method according to claim 1, further comprising collecting quality of service of the agent or the automatic response system IVR, and updating the quality of service matching information with collected data.

6. The method according to claim 1, wherein selecting an agent or the automatic response system IVR comprises selecting an agent.

7. The method according to claim 1, wherein selecting an agent or the automatic response system IVR comprises selecting an automatic response system IVR.

8. A routing server, comprising:
   a receiving module, configured to receive routing request information sent by an information processing device, wherein the routing request information carries customer media information, the customer information comprising an encoding format used for encoding media stream;
   a calculation module, configured to acquire customer requirement quality of service according to the encoding format carried in the customer media information, wherein said customer requirement quality of service comprises a rate for transmitting media stream that is encoded by using the encoding format; and
   a database, configured to store quality of service data matching information collected by the routing server, wherein the quality of service data matching information comprises a relationship between an agent or an automatic response system IVR and a bandwidth allocated for the agent or the automatic response system IVR; and
   a matching module, configured to determine an agent or an automatic response system IVR that matches the customer requirement quality of service according to the customer requirement quality of service, wherein the matching module is specifically configured to query the database to acquire the quality of service data matching information, determining the bandwidth that matches the rate for transmitting media stream, and select the agent or the automatic response system IVR corresponding to the determined bandwidth that matches the rate for transmitting media stream according to the quality of service data matching information.

9. The routing server according claim 8, wherein the matching module is further configured to negotiate with a terminal to re-determine the customer requirement quality of service when an agent that is matched with the customer requirement quality of service does not exist in quality of service data matching information, and to determine an agent or an automatic response system that is matched with the re-determined customer requirement quality of service according to the re-determined customer requirement quality of service.

10. The routing server according to claim 8, further comprising a quality of service collection module, configured to collect quality of service data of the agent, and store the quality of service data to a quality of service data table in a database.

11. The routing server according to claim 8, wherein the matching module is configured to determine an agent that matches the customer requirement quality of service according to the customer requirement quality of service.

12. The routing server according to claim 8, wherein the matching module is configured to determine an automatic response system IVR that matches the customer requirement quality of service according to the customer requirement quality of service.

13. A system for call routing, comprising:
- a routing server, configured to receive routing request information sent by an information processing device, wherein the routing request information carries customer media information that comprises an encoding format used for encoding media stream, the routing server also configured to acquire customer requirement quality of service according to the encoding format carried in the customer media information wherein said customer requirement quality of service comprises a rate for transmitting media stream that is encoded by using the encoding format and to determine an agent or an automatic response system IVR that is matched with the customer requirement quality of service according to the customer requirement quality of service; and
- an information processing device, configured to send routing request information to the routing server, wherein the routing request information carries the customer media information:
- wherein the routing server is configured to determine the agent or the automatic response system IVR that is matched with the customer requirement quality of service according to the customer requirement quality of service comprises, the routing server is configured to query quality of service data matching information which comprises a relationship between the agent or the automatic response system IVR and a bandwidth allocated for the agent or the automatic response system IVR, determining the bandwidth that matches the rate for transmitting media stream, and select the agent or the automatic response system IVR corresponding to the determined bandwidth that matches the rate for transmitting media stream according to the quality of service data matching information.

14. The system for call routing according to claim 13, wherein the system for call routing further comprises a universal access device that is configured to receive a call from a customer terminal and to initiate a call request to the information processing device, wherein the call request carries the customer media information.

\* \* \* \* \*